United States Patent
Uhm et al.

(10) Patent No.: US 10,770,758 B2
(45) Date of Patent: *Sep. 8, 2020

(54) CABLE-TYPE SECONDARY BATTERY INCLUDING WINDING CORE HAVING GUIDE PORTIONS

(71) Applicant: LG Chem, Ltd., Seoul (KR)

(72) Inventors: In-Sung Uhm, Daejeon (KR); Je-Young Kim, Daejeon (KR); Jong-Hwa Choi, Daejeon (KR); Suk-In Noh, Daejeon (KR); Dong-Chan Lee, Daejeon (KR)

(73) Assignee: LG Chem, Ltd. (KR)

( * ) Notice: Subject to any disclaimer, the term of this patent is extended or adjusted under 35 U.S.C. 154(b) by 114 days.

This patent is subject to a terminal disclaimer.

(21) Appl. No.: 15/766,157

(22) PCT Filed: Oct. 21, 2016

(86) PCT No.: PCT/KR2016/011936
§ 371 (c)(1),
(2) Date: Apr. 5, 2018

(87) PCT Pub. No.: WO2017/069586
PCT Pub. Date: Apr. 27, 2017

(65) Prior Publication Data
US 2018/0294532 A1      Oct. 11, 2018

(30) Foreign Application Priority Data

Oct. 21, 2015   (KR) .................. 10-2015-0147005

(51) Int. Cl.
*H01M 10/0587* (2010.01)
*H01M 2/14* (2006.01)
(Continued)

(52) U.S. Cl.
CPC ......... *H01M 10/0587* (2013.01); *H01M 2/02* (2013.01); *H01M 2/14* (2013.01);
(Continued)

(58) Field of Classification Search
CPC ......... H01M 10/0587; H01M 10/0525; H01M 2/16; H01M 2/18; H01M 4/583; H01M 4/661; H01M 4/75
(Continued)

(56) References Cited

U.S. PATENT DOCUMENTS

2007/0243456 A1   10/2007   Ahn et al.
2014/0178726 A1    6/2014   Kwon et al.
(Continued)

FOREIGN PATENT DOCUMENTS

CN   103875112 A   6/2014
CN   104466233 A   3/2015
(Continued)

OTHER PUBLICATIONS

Search report from International Application No. PCT/KR2016/011936, dated Jan. 23, 2017.
(Continued)

*Primary Examiner* — Sean P Cullen
(74) *Attorney, Agent, or Firm* — Lerner, David, Littenberg, Krumholz & Mentlik, LLP (57) ABSTRACT

Disclosed is a cable-type secondary battery, including: a winding core having guide portions formed by intaglio or relief in a spiral shape on the surface thereof; a sheet-type first inner electrode formed on the outside of the winding core surface between the guide portions by spiral winding; a sheet-type first separation layer formed on the outside of the first inner electrode by spiral winding; a sheet-type second inner electrode formed on the outside of the first separation layer by spiral winding; a second separation layer
(Continued)

formed on the outside of the second inner electrode by spiral winding; and an outer electrode formed on the outside of the second separation layer by spiral winding.

9 Claims, 7 Drawing Sheets

(51) Int. Cl.
    *H01M 2/02* (2006.01)
    *H01M 4/74* (2006.01)
    *H01M 10/058* (2010.01)
    *H01M 4/13* (2010.01)
    *H01M 2/16* (2006.01)
    *H01M 2/18* (2006.01)
    *H01M 4/583* (2010.01)
    *H01M 4/66* (2006.01)
    *H01M 4/75* (2006.01)
    *H01M 10/0525* (2010.01)
    *H01M 4/02* (2006.01)
(52) U.S. Cl.
    CPC ............... *H01M 2/16* (2013.01); *H01M 2/18* (2013.01); *H01M 4/13* (2013.01); *H01M 4/583* (2013.01); *H01M 4/661* (2013.01); *H01M 4/74* (2013.01); *H01M 4/75* (2013.01); *H01M 10/058* (2013.01); *H01M 10/0525* (2013.01); *H01M 2004/027* (2013.01); *H01M 2004/028* (2013.01)
(58) Field of Classification Search
    USPC .......................................................... 429/94
    See application file for complete search history.

(56) References Cited

U.S. PATENT DOCUMENTS

| 2014/0227572 | A1 | 8/2014 | Kwon et al. | |
|---|---|---|---|---|
| 2014/0234672 | A1 | 8/2014 | Kwon et al. | |
| 2014/0370350 | A1* | 12/2014 | Kwon | H01M 4/75 |
| | | | | 429/94 |
| 2014/0370351 | A1* | 12/2014 | Kwon | H01M 4/02 |
| | | | | 429/94 |
| 2014/0377613 | A1 | 12/2014 | Kwon et al. | |
| 2014/0377620 | A1* | 12/2014 | Kwon | H01M 4/667 |
| | | | | 429/94 |
| 2014/0377651 | A1* | 12/2014 | Kwon | H01M 10/0422 |
| | | | | 429/217 |
| 2015/0357671 | A1 | 12/2015 | Park et al. | |
| 2016/0133942 | A1 | 5/2016 | Kwon et al. | |
| 2018/0309133 | A1* | 10/2018 | Uhm | H01M 4/74 |

FOREIGN PATENT DOCUMENTS

| EP | 2634852 | A1 | 9/2013 |
|---|---|---|---|
| EP | 2822059 | A1 | 1/2015 |
| KR | 20050099903 | A | 10/2005 |
| KR | 20080105655 | A | 12/2008 |
| KR | 20140047010 | A | 4/2014 |
| KR | 20150050131 | A | 5/2015 |
| KR | 101542096 | B1 | 8/2015 |
| WO | 2015080499 | A1 | 6/2015 |

OTHER PUBLICATIONS

Supplementary European Search Report for EP16857843 dated Sep. 11, 2018.
Chinese Search Report for Application No. 201680059730.6 dated Jun. 15, 2020, 1 page.

* cited by examiner

CABLE-TYPE SECONDARY BATTERY INCLUDING WINDING CORE HAVING GUIDE PORTIONS

CROSS-REFERENCE TO RELATED APPLICATIONS

The present application is a national phase entry under 35 U.S.C. § 371 of International Application No. PCT/KR2016/011936, filed Oct. 21, 2016, which claims priority from Korean Patent Application No. 10-2015-0147005, filed Oct. 21, 2015, the disclosures of which are hereby incorporated herein by reference.

TECHNICAL FIELD

The present disclosure relates to a cable-type secondary battery. More particularly, the present disclosure relates to a cable-type secondary battery which realizes high capacity and allows easy deformation.

BACKGROUND ART

In recent times, a secondary battery refers to a device which converts external electric energy into the form of chemical energy and stores it therein, and then generates electricity as necessary. Such a secondary battery is also called the name of 'rechargeable battery' which means a battery capable of being charged many times. Typical secondary batteries include a lead storage battery, nickel cadmium (Ni—Cd) battery, nickel metal hydride (NiMH) battery, lithium ion (Li-ion) battery and a lithium ion (Li-ion) polymer battery. A secondary battery provides both an economical advantage and an environmental advantage as compared to a disposable primary battery.

Currently, a secondary battery is used for some applications requiring low electric power. For example, such applications include a device that helps starting of a car, portable system, instrument and a no-brake power supply system. Recently, development of wireless communication technology leads popularization of a portable system. In addition, there is a tendency to convert many conventional systems into wireless systems. Under these circumstances, there is an exploding demand for secondary batteries. Further, hybrid cars and electric cars have been commercialized with a view to preventing environmental pollution. Such next-generation vehicles adopt secondary batteries to reduce the cost and weight and to increase the service life.

In general, secondary batteries are generally provided as cylindrical, prismatic or pouch-type batteries. This is because secondary batteries are manufactured by installing an electrode assembly including an anode, cathode and a separator into a cylindrical or prismatic metal can or a pouch-type casing made of an aluminum laminate sheet, and then injecting an electrolyte to the electrode assembly. Therefore, a predetermined space for installing a secondary battery is required essentially. Thus, such cylindrical, prismatic or pouch-like shapes of secondary batteries undesirably function as limitations in developing various types of portable systems. As a result, there is a need for a novel type of secondary battery which allows easy deformation.

To meet such requirement, a linear battery having a significantly large ratio of length to sectional diameter has been suggested. Korean Laid-Open Patent No. 2005-99903 discloses a variable battery including an inner electrode, an outer electrode and an electrolyte layer interposed between the electrodes. However, such a battery has poor flexibility.

In addition, since a cable-type secondary battery uses a polymer electrolyte to form an electrolyte layer, it is difficult to inject an electrolyte to the active material of an electrode. This results in the problems of an increase in resistance of a battery and degradation of capacity characteristics and cycle characteristics.

In addition, when forming a cable-type secondary battery, a non-uniform gap is generated between each electrode and the separator interposed between the inner electrode and the outer electrode. Due to such a gap, an electrolyte may not be introduced to the outer electrode active material layer smoothly, resulting in the problem of degradation of the quality of a battery.

Further, when a wire-type current collector is used for a cable-type secondary battery, resistance becomes high as compared to a sheet-type current collector. This may result in a problem of degradation of the quality of a battery.

DISCLOSURE

Technical Problem

The present disclosure is designed to solve the problems of the related art, and therefore the present disclosure is directed to providing a novel high-capacity linear-structure secondary battery which has excellent flexibility, allows easy deformation and maintains stability and excellent quality of a secondary battery.

Technical Solution

In one aspect of the present disclosure, there are provided cable-type secondary batteries according to the following embodiments.

According to a first embodiment, there is provided a cable-type secondary battery, including: a winding core having guide portions formed by intaglio or relief in a spiral shape on the surface thereof; a sheet-type first inner electrode formed on the outside of the winding core surface between the guide portions by spiral winding; a sheet-type first separation layer formed on the outside of the first inner electrode by spiral winding; a sheet-type second inner electrode formed on the outside of the first separation layer by spiral winding; a second separation layer formed on the outside of the second inner electrode by spiral winding; and an outer electrode formed on the outside of the second separation layer by spiral winding.

According to a second embodiment, there is provided a cable-type secondary battery of the first embodiment, wherein the winding core is a wire-type, twisted wire-type, hollow, net-type, strip-type or mesh-type winding core.

According to a third embodiment, there is provided a cable-type secondary battery of the first embodiment or the second embodiment, wherein the winding core includes carbon nanotubes; stainless steel; aluminum; nickel; titanium; baked carbon; copper; stainless steel surface-treated with carbon, nickel, titanium or silver; aluminum-cadmium alloy; or a polymer.

According to a fourth embodiment, there is provided a cable-type secondary battery of any one of the first embodiment to the third embodiment, wherein the section perpendicular to the longitudinal direction of the winding core has a circular, ellipsoidal, quadrangular or triangular shape.

According to a fifth embodiment, there is provided a cable-type secondary battery of any one of the first embodiment to the fourth embodiment, wherein the first inner electrode includes a first inner current collector and a first inner electrode active material layer formed on one surface of the first inner current collector, and the outer electrode includes an outer current collector and an outer electrode active material layer formed on one surface of the outer current collector.

According to a sixth embodiment, there is provided a cable-type secondary battery of the fifth embodiment, which further includes a polymer film layer formed on at least one of the other surface of the first inner current collector and the other surface of the outer current collector.

According to a seventh embodiment, there is provided a cable-type secondary battery of any one of the first embodiment to the sixth embodiment, wherein the second inner electrode includes a second inner current collector and second inner electrode active material layers formed on both surfaces of the second inner current collector.

According to an eighth embodiment, there is provided a cable-type secondary battery of any one of the fifth embodiment to the seventh embodiment, wherein at least one of the first inner current collector, the second inner current collector and the outer current collector is a film-type or mesh-type current collector.

According to a ninth embodiment, there is provided a cable-type secondary battery of any one of the first embodiment to the eighth embodiment, wherein the sheet-type inner electrode, the first separation layer, the second inner electrode, the second separation layer and the outer electrode has a structure of a strip extended in one direction.

According to a tenth embodiment, there is provided a cable-type secondary battery of any one of the first embodiment to the ninth embodiment, wherein the winding core is provided with a space therein, and a lithium ion supplying core portion containing an electrolyte, an inner electrode current collector core portion or a filler core portion is formed in the space.

According to an eleventh embodiment, there is provided a cable-type secondary battery of the tenth embodiment, wherein the inner electrode current collector core portion is made of carbon nanotubes; stainless steel; aluminum; nickel; titanium; baked carbon; copper; stainless steel surface-treated with carbon, nickel, titanium or silver; aluminum-cadmium alloy; a non-conductive polymer surface-treated with a conductive material; or a conductive polymer.

According to a twelfth embodiment, there is provided a cable-type secondary battery of the tenth embodiment, wherein the lithium ion supplying core portion includes a gel polymer electrolyte and a support.

According to a thirteenth embodiment, there is provided a cable-type secondary battery of the tenth embodiment, wherein the lithium ion supplying core portion includes a liquid electrolyte and a porous carrier.

According to a fourteenth embodiment, there is provided a cable-type secondary battery of the tenth embodiment, wherein the filler core portion includes a polymer resin, rubber or an inorganic material, and the polymer resin, the rubber or the inorganic material has a wire-, fiber-, powder-, mesh- or foam-like shape.

According to a fifteenth embodiment, there is provided a cable-type secondary battery of any one of the first embodiment to the fourteenth embodiment, wherein the first inner electrode and the outer electrode are cathodes and the second inner electrode is an anode, or the first inner electrode and the outer electrode are anodes and the second inner electrode is a cathode.

Advantageous Effects

According to an embodiment of the present disclosure, besides the constitutional parts of an electrode, a winding core having excellent flexibility and including guide portions inducing spiral winding are provided in a battery. In addition, the winding core prevents an electrode from being affected by stimuli, such as bending, distortion and drawing on a cable-type secondary battery, and the inner electrode support allows preservation of alignment when winding a strip-type anode/separator/cathode.

According to another embodiment of the present disclosure, a wire-type current collector having high resistance is avoided and a sheet-type electrode is provided. Thus, it is possible to reduce the resistance of a cable-type secondary battery and to improve the quality of the battery.

According to still another embodiment of the present disclosure, the inner electrode has a multi-layer electrode structure including a first inner electrode and a second inner electrode. Thus, it is possible to realize a high-capacity cable-type secondary battery.

According to still another embodiment, a lithium ion supplying core portion containing an electrolyte is located inside of the inner electrode support and the inner electrode support has an open structure. Thus, the electrolyte of the lithium ion supplying core portion infiltrates into an electrode active material with ease, thereby facilitating the supply and exchange of lithium ions. In this manner, it is possible to provide a battery with excellent capacity characteristics and cycle characteristics.

According to yet another embodiment, the cable-type secondary battery is provided with an inner electrode support having an open structure, and the sheet-type electrode and the separation layer are wound spirally like a spring structure so that they may retain a linear shape and release stress caused by external force.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 2:
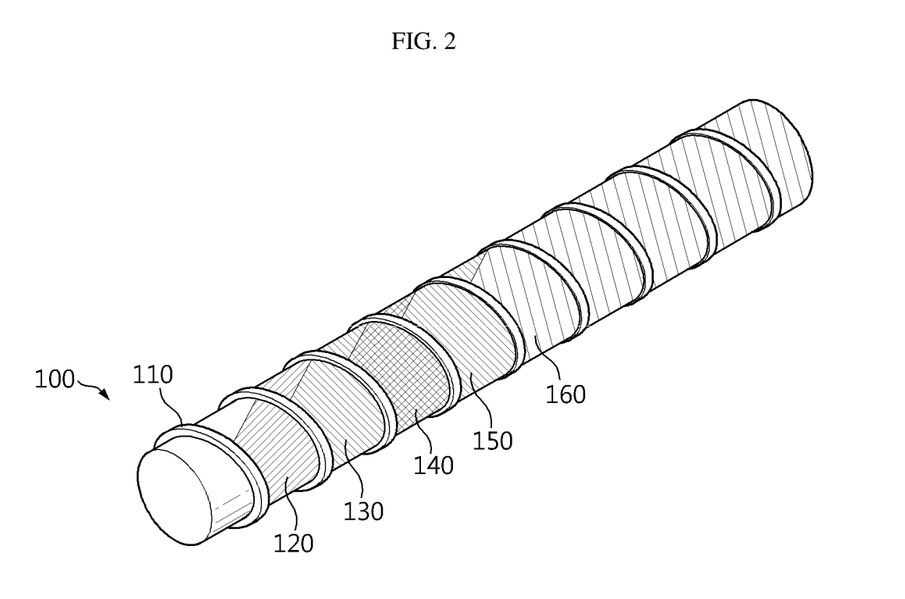
FIG. 2 shows the structure of the cable-type secondary battery according to an embodiment of the present disclosure.

Referring to FIG. 2, the cable-type secondary battery according to an embodiment of the present disclosure includes: a winding core 100 having guide portions 110 formed by intaglio or relief in a spiral shape on the surface thereof; a sheet-type first inner electrode 120 formed on the outside of the winding core surface between the guide portions by spiral winding; a sheet-type first separation layer 130 formed on the outside of the first inner electrode by spiral winding; a sheet-type second inner electrode 140 formed on the outside of the first separation layer by spiral winding; a second separation layer 150 formed on the outside of the second inner electrode by spiral winding; and an outer electrode 160 formed on the outside of the second separation layer by spiral winding.

When a current collector is applied in the form of a linear wire, it is locally in contact with the facing electrode and the remaining portion forms a cavity where the interval between electrodes is increased, resulting in an increase in resistance and degradation of the quality of a battery. However, according to the present disclosure, the first inner electrode, the second inner electrode and the outer electrode are electrodes using a sheet-type current collector as a current collector. Therefore, the electrodes facing each other (the first inner electrode and the second inner electrode; the second inner electrode and the outer electrode) are conjugated or contacted as a whole, thereby providing significantly improved rate characteristics. In addition, according to the present disclosure, when the electrodes facing each other are wound spirally (diagonally), they can be aligned regularly. Thus, even when a cable-type secondary battery is bent, it is possible to minimize damages upon the battery, including generation of a short-circuit of electrodes caused by separation of the electrodes facing each other.

Herein, the term 'spiral' may be interchanged with 'helix', means a shape which winds diagonally in a certain range, and generally refers to a shape similar to the shape of a general spring.

The sheet-type first inner electrode, the second inner electrode and the outer electrode may have a strip structure extended in one direction.

Additionally, the sheet-type first inner electrode, the second inner electrode and the outer electrode may be formed by spiral winding so as to avoid an overlap. Herein, each of the sheet-type first inner electrode, the second inner electrode and the outer electrode may be formed by spiral winding with an interval of at most two times of the width of the outer electrode so as to avoid an overlap, thereby preventing degradation of the quality of a battery.

Otherwise, the sheet-type first inner electrode, the second inner electrode and the outer electrode may be formed by spiral winding to form an overlap. Herein, each of the sheet-type first inner electrode, the second inner electrode and the outer electrode may be formed by spiral winding so that the overlap may have a width corresponding to 0.9 times or less of the width of each of the sheet-type first inner electrode, the second inner electrode and the outer electrode.

The winding core may be a wire-type, twisted wire-type, hollow, net-type, strip-type or mesh-type winding core.

According to an embodiment of the present disclosure, the winding core may be processed by relief or intaglio, or the guide portions may be formed by using an injection process.

The winding core may include carbon nanotubes; stainless steel; aluminum; nickel; titanium; baked carbon; copper; stainless steel surface-treated with carbon, nickel, titanium or silver; aluminum-cadmium alloy; or a polymer. Herein, the polymer is not particularly limited and non-limiting examples of the polymer may include polyurethane, polyolefin (PE, PP, etc.) and various types of rubber.

The section perpendicular to the longitudinal direction of the winding core may be a circular, ellipsoidal, quadrangular or triangular section.

Figure 1:
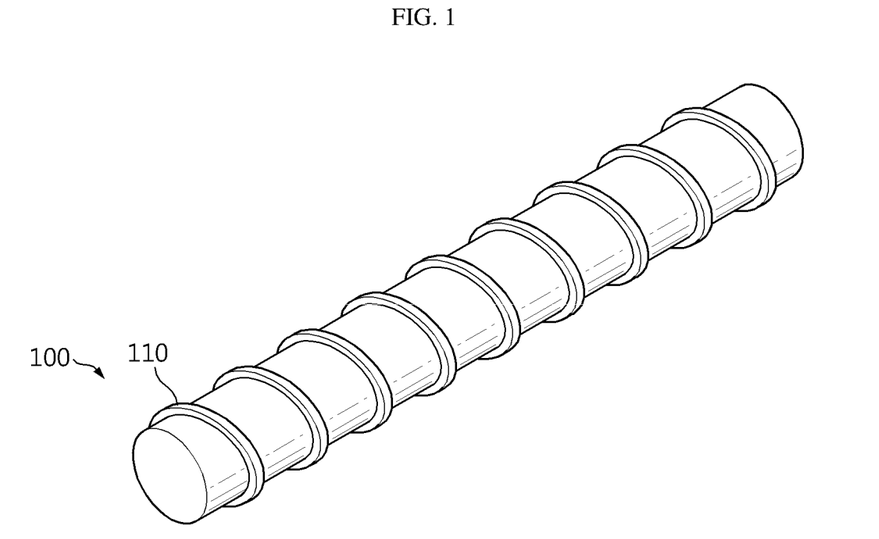
FIG. 1 shows a winding core having guide portions of the cable-type secondary battery according to an embodiment of the present disclosure.

FIG. 1 shows a winding core 100 having guide portions 110 of the cable-type secondary battery according to an embodiment of the present disclosure.

Figure 4:
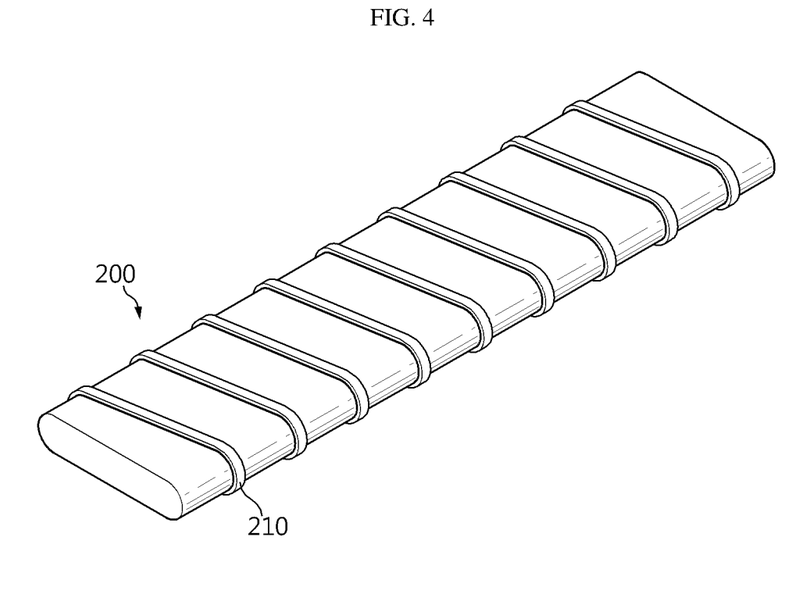
FIG. 4 shows a winding core having guide portions of the cable-type secondary battery according to an embodiment of the present disclosure.
Figure 5:
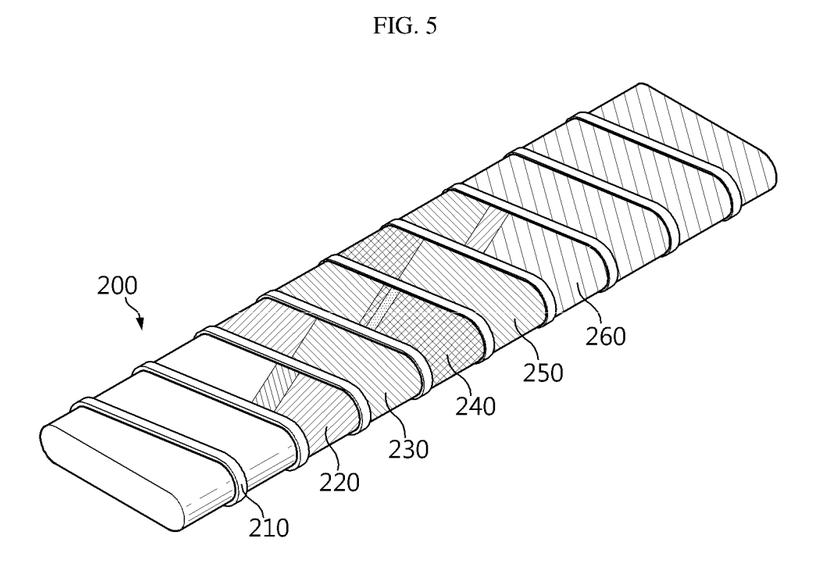
FIG. 5 shows the structure of the cable-type secondary battery according to an embodiment of the present disclosure.

FIG. 4 shows a winding core 200 having guide portions 210 when the section perpendicular to the longitudinal direction of the winding core is ellipsoidal in the cable-type secondary battery according to an embodiment of the present disclosure, and FIG. 5 shows the cable-type secondary battery provided with such a winding core.

Particularly, referring to FIG. 5, the cable-type secondary battery according to an embodiment of the present disclosure includes: a winding core 200 having guide portions 210 formed by intaglio or relief in a spiral shape on the surface thereof; a sheet-type first inner electrode 220 formed on the outside of the winding core surface between the guide portions by spiral winding; a sheet-type first separation layer 230 formed on the outside of the first inner electrode by spiral winding; a sheet-type second inner electrode 240 formed on the outside of the first separation layer by spiral winding; a second separation layer 250 formed on the outside of the second inner electrode by spiral winding; and an outer electrode 260 formed on the outside of the second separation layer by spiral winding.

The winding core has guide portions formed by intaglio or relief in a continuous spiral shape on the surface thereof. In addition, the sheet-type first inner electrode, the first separation layer, the second inner electrode, the second separator and the outer electrode may be guided in a spiral shape and wound successively on the outside of each of them.

Herein, the winding may be carried out on the outside of the winding core between the guide portions in the order of the inner electrode/separation layer/outer electrode or the first inner electrode/first separation layer/second inner electrode/second separation layer/outer electrode. Otherwise, a sheet of inner electrode/separation layer/outer electrode or a sheet of the first inner electrode/first separation layer/second inner electrode/second separation layer/outer electrode may be laminated in advance in an elongated strip-like shape to form an integrated sheet, and then winding may be carried out to simplify a winding process.

Figure 7:
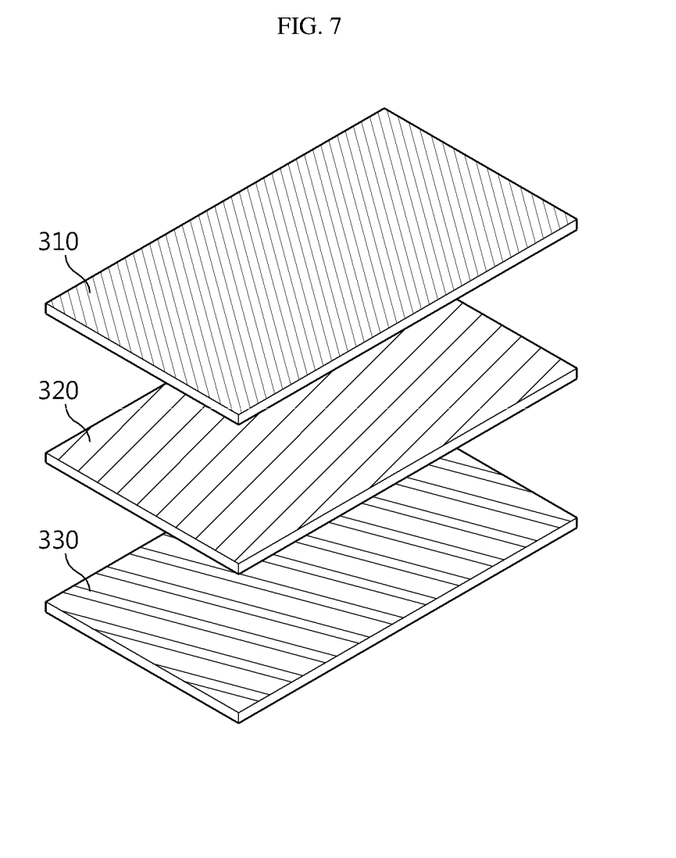
FIG. 7 shows the structure of the sheet-type first inner electrode according to an embodiment of the present disclosure.
Figure 8:
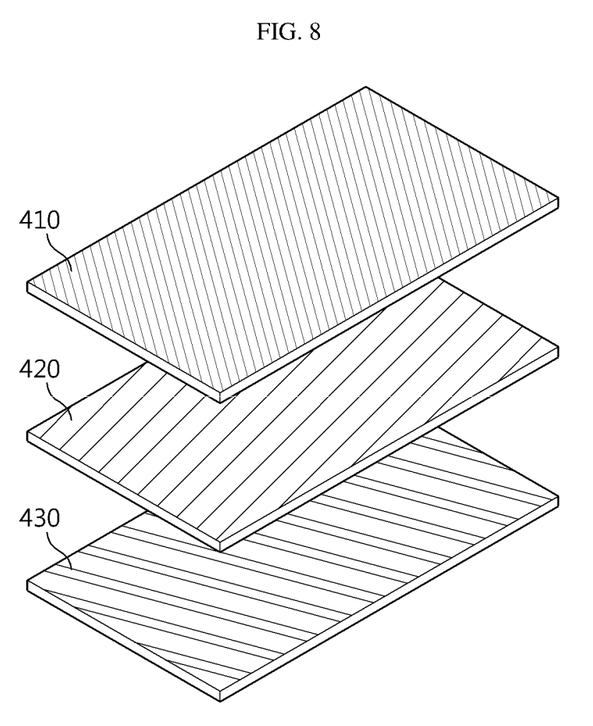
FIG. 8 shows the structure of the sheet-type outer electrode according to an embodiment of the present disclosure.

Meanwhile, FIG. 7 shows the structure of a sheet-type first inner electrode according to an embodiment of the present disclosure, and FIG. 8 shows the structure of a sheet-type outer electrode according to an embodiment of the present disclosure.

The first inner electrode includes a first inner current collector 320 and a first inner electrode active material layer 310 formed on one surface of the first inner current collector 320. The outer electrode includes an outer current collector 420 and an outer electrode active material layer 410 formed on one surface of the outer current collector 420.

Herein, a polymer film layer 330 formed on the other surface of the first current collector may be further provided and a polymer film layer 430 formed on the other surface of the outer current collector may also be provided. Such polymer film layers may function to support the first inner current collector and outer current collector so that each of the first inner current collector and outer current collector may be formed as a thin film having a smaller thickness. For example, the first inner current collector and outer current collector may be formed on the polymer film layer through vapor deposition, or the like.

Herein, the polymer film layer may include any one selected from the group consisting of polyolefins, polyesters, polyimides and polyamides, or a combination of at least two of them.

In addition, the first inner current collector or outer current collector may be a film-type current collector or mesh-type current collector.

According to an embodiment of the present disclosure, when the electrode current collector is a wound sheet-type or wound mesh-type current collector, it is possible to solve the problems of a wire-type electrode current collector, including a large resistance element derived from a small surface area and degradation of rate characteristics of a battery caused by the resistance of the battery during high-rate charging/discharging.

Figure 9:
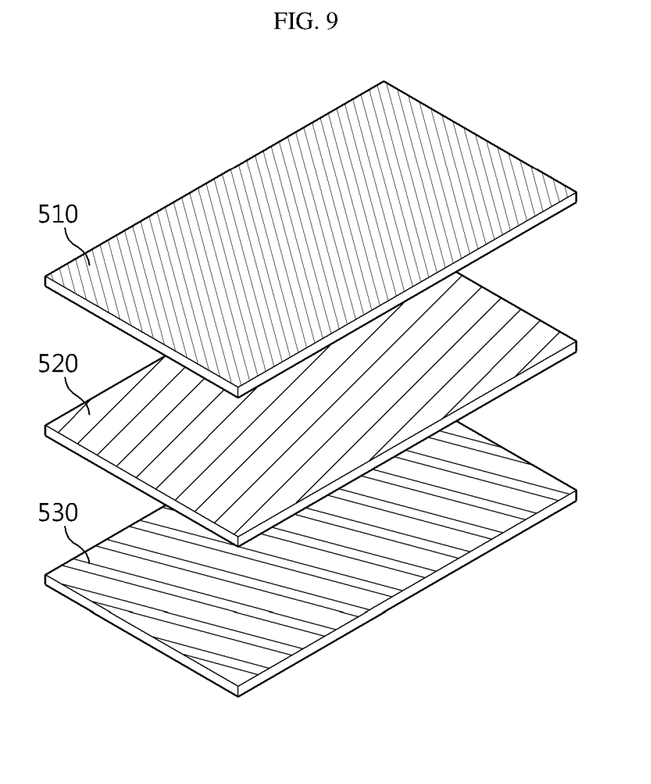
FIG. 9 and FIG. 10 show the structure of the second inner electrode according to an embodiment of the present disclosure.
Figure 10:
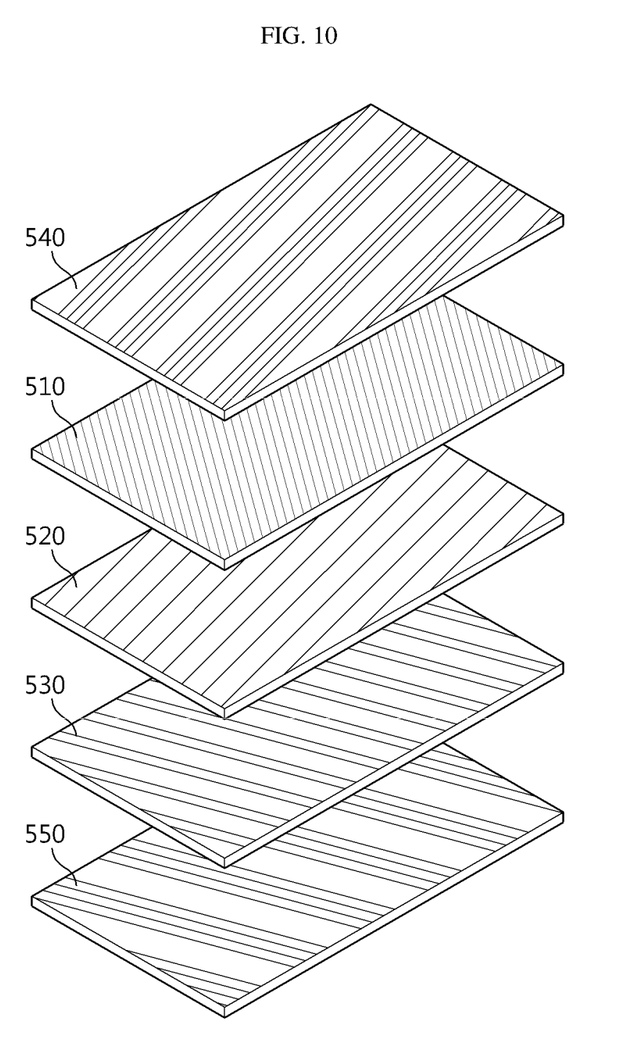

FIG. 9 and FIG. 10 show the structure of the second inner electrode according to an embodiment of the present disclosure.

Referring to FIG. 9, the second inner electrode may include a second inner current collector 520 and second inner electrode active material layers 510, 530 formed on both surfaces of the second inner current collector 520. Herein, the second inner current collector may be a film-type or mesh-type current collector.

Meanwhile, the first inner electrode, the second inner electrode and the outer electrode may further include a polymer support layer formed on the surface of each active material layer.

When the polymer support layer is further provided on the surface of each active material layer according to an embodiment of the present disclosure, it is possible to prevent a cracking phenomenon occurring on the surface of the active material layer significantly even under the bending of a cable-type secondary battery caused by external force. Therefore, separation of the active material layer is further prevented, resulting in further improvement of the quality of a battery. Further, the polymer support layer may have a porous structure. In this manner, it is possible to facilitate the introduction of electrolyte into an active material layer and to prevent an increase in electrode resistance.

Herein, the polymer support layer may include a polar linear polymer, oxide-based linear polymer or a mixture thereof.

Herein, the polar linear polymer may be any one selected from the group consisting of polyacrylonitrile, polyvinyl chloride, polyvinylidene fluoride (PVDF), polyvinylidene fluoride-co-hexafluoropropylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate, polyurethane and poly-p-phenylene terephthalamide, or a combination thereof.

In addition, the oxide-based linear polymer may be any one selected from the group consisting of polyethylene oxide, polypropylene oxide, polyoxymethylene and polydimethylsiloxane, or a combination thereof.

The polymer support layer may be a porous polymer layer having a pore size of 0.01-10 μm and a porosity of 5-95%.

The porous structure of the porous polymer layer may be formed by phase separation of phase transition caused by a non-solvent during the manufacture thereof.

For example, polyvinylidene fluoride-hexafluoropropylene as a polymer is added to acetone functioning as a solvent to prepare a solution having a solid content of 10 wt %. Then, water or ethanol as a non-solvent is added to the solution in an amount of 2-10 wt % to provide a polymer solution.

While the polymer evaporates after its coating, phase transition occurs so that the region occupied by the non-solvent becomes pores in the phase separated parts of the non-solvent and the polymer. Therefore, it is possible to control the pore size according to the solubility of the non-solvent and polymer and the content of the non-solvent.

According to FIG. 10, the second inner electrode may include a second inner current collector 520, second inner electrode active material layers 510, 530 formed on both surfaces of the second inner current collector 520, and polymer support layers 540, 550 formed on the surfaces of the second electrode active materials layers, respectively.

Meanwhile, when external force, such as bending or distortion, is applied to a secondary battery, the electrode active material layer may be separated from the current collector. Therefore, a large amount of binder ingredients is incorporated to the electrode active material layer for the purpose of the flexibility of the electrode. However, such a large amount of binder causes swelling in the presence of an electrolyte and thus may be separated from the current collector with ease, resulting in degradation of the quality of a battery.

Therefore, at least one of the first inner current collector and the outer current collector may further include a primer coating layer containing a conductive material and a binder in order to improve the adhesion between the electrode active material layer and the current collector. The second inner current collector as described hereinafter may further include a primer coating layer including a conductive material and a binder for the same reason.

Herein, the conductive material may include any one selected from the group consisting of carbon black, acetylene black, ketjen black, carbon fibers, carbon nanotubes and graphene, or a combination thereof.

In addition, the binder may be any one selected from the group consisting of polyvinylidene fluoride (PVDF), polyvinylidene fluoride-co-hexafluoropropylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxymethyl cellulose, styrene-butadiene rubber, acrylonitrile-styrene-butadiene copolymer and polyimide, or a combination thereof.

In addition, the inner current collector and outer current collector may further include a plurality of intrusions on at least one surface in order to increase the surface area of the current collector. Herein, the intrusions may have a continuous pattern or a discontinuous pattern. In other words, the current collectors may have a continuous pattern of intrusions spaced apart from each other and formed in the longitudinal direction, or a discontinuous pattern of a plurality of holes. The holes may be circular or polygonal holes.

Meanwhile, the inner current collector may be made of stainless steel; aluminum; nickel; titanium; baked carbon; copper; stainless steel surface-treated with carbon, nickel, titanium or silver; aluminum-cadmium alloy; a non-conductive polymer surface-treated with a conductive material; or a conductive polymer.

The current collector functions to collect the electrons generated by the electrochemical reaction of an electrode active material or to supply the electrons required for electrochemical reaction. Particularly, when using a non-conductive polymer surface-treated with a conductive material or using a polymer conductor including a conductive polymer, the flexibility is relatively higher as compared to a metal such as copper or aluminum. In addition, it is possible to accomplish the weight lightening of a battery by using a polymer current collector instead of a metal current collector.

Conductive materials that may be used include polyacetylene, polyaniline, polypyrrole, polythiophene, polysulfur nitride, indium tin oxide (ITO), silver, palladium and nickel. Conductive polymers that may be used include polyacetylene, polyaniline, polypyrrole, polythiophene and polysulfur nitride. However, the non-conductive polymer used for a current collector is not particularly limited.

The outer current collector according to the present disclosure may include stainless steel, aluminum, nickel, titanium, baked carbon or copper; stainless steel surface-treated with carbon, nickel, titanium or silver; aluminum-cadmium alloy; a non-conductive polymer surface-treated with a conductive material; a conductive polymer; metal paste including metal powder which is Ni, Al, Au, Pd/Ag, Cr, Ta, Cu, Ba or ITO; or carbon paste containing carbon powder which is graphite, carbon black or a carbon nanotube. Herein, the conductive material and conductive polymer may be the same as used for the above-described inner current collector.

Meanwhile, the winding core having guide portions on the surface thereof may have a hollow structure having a space therein.

In addition, an inner electrode current collector core portion may be formed in the space formed in the winding core.

Herein, the inner electrode current collector core portion may be formed of carbon nanotubes; stainless steel; aluminum; nickel; titanium; baked carbon; copper; stainless steel surface-treated with carbon, nickel, titanium or silver; aluminum-cadmium alloy; a non-conductive polymer surface-treated with a conductive material; or a conductive polymer.

In addition, a lithium ion supplying core portion may be formed in the space formed in the winding core.

The conventional cable-type secondary battery includes an electrolyte layer between an inner electrode and an outer electrode and the electrolyte layer isolates the inner electrode from the outer electrode to prevent a short-circuit. Thus, it is required to use a gel polymer electrolyte or solid polymer electrolyte having a predetermined level of mechanical properties. However, such a gel polymer electrolyte or solid polymer electrolyte does not have sufficient quality as a lithium ion source. Thus, it is required for the electrolyte layer to have an increased thickness in order to supply lithium ions sufficiently to the electrode active material layer. Such an increase in thickness of the electrolyte layer increases the gap between the electrodes, resulting in degradation of the quality of a battery caused by an increase in resistance.

To solve the above-mentioned problem, according to an embodiment of the present disclosure, a lithium ion supplying core portion containing an electrolyte is provided in the inner electrode support having an open structure so that the electrolyte of the lithium ion supplying core portion may pass through the inner electrode support and may arrive at the inner electrode active material layer and outer electrode active material layer.

Herein, the lithium ion supplying core portion may include a gel polymer electrolyte and a support.

In addition, the lithium ion supplying core portion may include a liquid electrolyte and a porous carrier.

Further, a filler core portion may be formed in the space formed in the winding core.

The filler core portion may have various shapes, such as a wire, fiber, powder, mesh or foam, and may include materials for improving various performances of a cable-type secondary battery, such as a polymer resin, rubber and inorganic material, other than the materials forming the inner electrode current collector core portion and lithium ion supplying core portion.

The cable-type secondary battery according to an embodiment of the present disclosure has a predetermined shape of a horizontal section and may have a linear structure elongated along the longitudinal direction to the horizontal section. The cable-type secondary battery according to an embodiment of the present disclosure may have flexibility and allows easy deformation. Herein, 'predetermined shape' is not particularly limited and any shape is allowed as long as it does not adversely affect the present disclosure.

Meanwhile, the lithium ion supplying core portion includes an electrolyte. Although there is no particular limitation in the electrolyte, particular examples of the electrolyte may include a non-aqueous electrolyte using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone, sulfolane, methyl acetate (MA) or methyl propionate (MP); a gel polymer electrolyte using PEO, PVdF, PVdF-HFP, PMMA, PAN or PVAc; or a solid electrolyte using PEO, polypropylene oxide (PPO), polyethylene imine (PEI), polyethylene sulfide (PES) or polyvinyl acetate (PVAc); or the like. In addition, the electrolyte may further include a lithium salt, such as LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, lithium chloroborate, lithium lower aliphatic carboxylate or lithium tetraphenylborate. Further, the lithium ion supplying core portion may include electrolyte alone. In the case of a liquid electrolyte, a porous carrier may be used.

The first inner electrode and outer electrode may be cathodes and the second inner electrode may be an anode, or the first inner electrode and outer electrode may be anodes and the second inner electrode may be a cathode.

The electrode active material layer according to the present disclosure functions to transfer ions through a current collector and such ion transfer is based on the interaction through the intercalation of ions from the electrolyte layer and deintercalation of ions toward the electrolyte layer.

The electrode active material layer may be classified into an anode active material layer and a cathode active material layer.

Particularly, when the first inner electrode and outer electrode are anodes, each of the first inner electrode active material and outer electrode active material may independently include any one active material particle selected from the group consisting of carbonaceous materials, such as natural graphite and artificial graphite; metals (Me), such as lithium-containing titanium composite oxide (LTO), Si, Sn, Li, Zn, Mg, Cd, Ce, Ni or Fe; alloys of the metals (Me); oxides (MeOx) of the metals (Me); and composites of the metals with carbon, or a mixture thereof. When the first inner electrode and outer electrode are anodes, each of the first inner electrode active material and outer electrode active material may be independently any one active material particle selected from the group consisting of $LiCoO_2$, $LiNiO_2$, $LiMn_2O_4$, $LiCoPO_4$, $LiFePO_4$, $LiNiMn\ CoO_2$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents an atomic proportion of an element forming the oxides, and $0 \leq x < 0.5$, $0 \leq y < 0.5$, $0 \leq z < 0.5$, $0 < x+y+z \leq 1$), or a mixture thereof.

In addition, when the first inner electrode and outer electrode are cathodes and the second inner electrode is an anode, the first inner electrode active material layer and outer electrode active material layer may be cathode active material layers and the second inner electrode active material layer may be an anode active material layer.

The electrode active material layer includes an electrode active material, binder and a conductive material, and is coupled with a current collector to form an electrode. When the electrode is deformed, for example, folded or bent severely by external force, separation of the electrode active material may occur. Separation of the electrode active material causes degradation of the quality and capacity of a battery. However, since the current collector has elasticity, it functions to disperse force during the deformation caused by the external force. Thus, the electrode active material layer is less deformed, thereby preventing separation of the active material.

The first separation layer and the second separation layer may use an electrolyte layer or a separator.

The electrolyte functioning as a channel of ions may include a gel polymer electrolyte using PEO, PVdF, PVdF-HFP, PMMA, PAN or PAVc; or a solid electrolyte using PEO, polypropylene oxide (PPO), polyethylene imine (PEI), polyethylene sulfide (PES) or polyvinyl acetate (PAVc); or the like. The matrix of the solid electrolyte may include a polymer or ceramic glass as a fundamental skeleton. In the case of a general polymer electrolyte, ions may move very slowly due to reaction rate even though ion conductivity is satisfied. Thus, it is preferred to use a gel polymer electrolyte through which ion transfer is carried out more easily as compared to a solid electrolyte. Since a gel polymer electrolyte does not have excellent mechanical properties, it may include a support to supplement such mechanical properties. The support that may be used includes a porous support or crosslinked polymer. Since the electrolyte layer according to the present disclosure also functions as a separator, it is not necessary to use an additional separator.

According to an embodiment, the electrolyte layer may further include a lithium salt. The lithium salt improves ion conductivity and reaction rate and non-limiting examples thereof may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborane, lower aliphatic lithium carboxylate, lithium 4-phenylborate, imide, or the like.

Although there is no particular limitation, the separator may be a porous polymer substrate made of a polyolefin polymer selected from the group consisting of an ethylene homopolymer, propylene homopolymer, ethylene-butene copolymer, ethylene-hexene copolymer and ethylene-methacrylate copolymer; a porous polymer substrate made of a polymer selected from the group consisting of polyester, polyacetal, polyamide, polycarbonate, polyimide, polyetherether ketone, polyether sulfone, polyphenylene oxide, polyphenylene sulfide and polyethylene naphthalate; a porous substrate formed of a mixture of inorganic particles and a binder polymer; or a separator provided with a porous coating layer formed of a mixture of inorganic particles and a binder polymer on at least one surface of the porous polymer substrate.

Herein, in the porous coating layer formed of a mixture of inorganic particles and a binder, the inorganic particles are bound to each other by the binder polymer while there are in contact with each other, thereby forming interstitial volumes among the inorganic particles. In addition, the interstitial volumes become vacant spaces to form pores.

In other words, the binder polymer attaches the inorganic particles to each other so that they may retain their binding states. For example, the binder polymer connects and fixes the inorganic particles with each other. In addition, the pores of the porous coating layer are those formed by the interstitial volumes among the inorganic particles which become vacant spaces. The space is defined by the inorganic particles facing each other substantially in a closely packed or densely packed structure of the inorganic particles. It is possible to provide a channel for transferring lithium ions through the pores of the porous coating layer and such a channel is essential for the operation of a battery.

Particularly, it is preferred to use a separator made of a non-woven web corresponding to a porous polymer substrate made of a polymer selected from the group consisting of polyester, polyacetal, polyamide, polycarbonate, polyimide, polyetherether ketone, polyether sulfone, polyphenylene oxide, polyphenylene sulfide and polyethylene naphthalate so that the lithium ions of the lithium ion supplying core portion may be transferred to the outer electrode with ease.

According to an embodiment, the cable-type secondary battery has a protective coating, which is an insulator formed on the outside of the outer current collector in order to protect electrodes against moisture in the air and external impact.

The protective coating may use a conventional polymer resin including a water barrier layer. Herein, the water barrier layer may include aluminum or a liquid crystal polymer having excellent water barrier property. The polymer resin that may be used includes PET, PVC, HDPE or epoxy resin.

Figure 3:
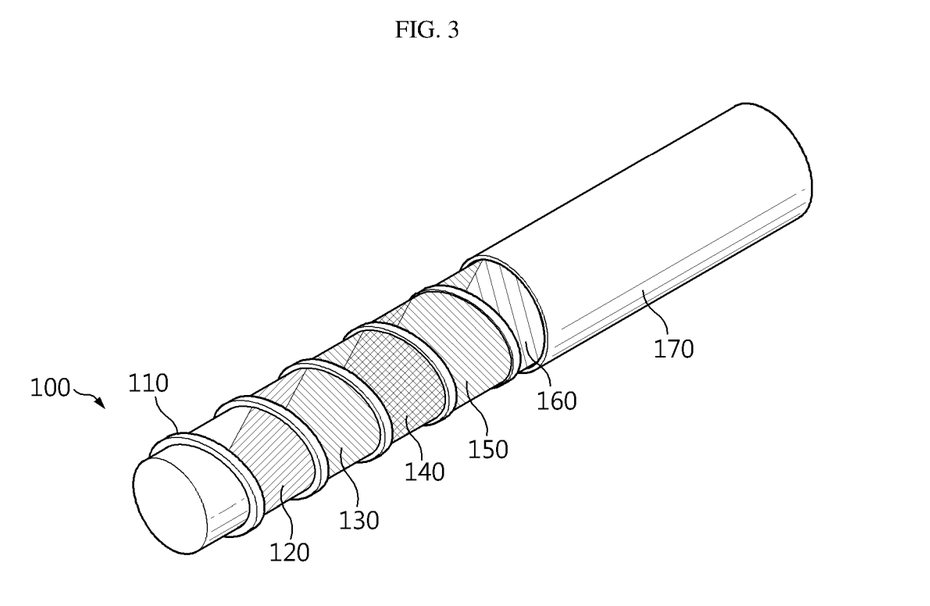
FIG. 3 shows the structure of the cable-type secondary battery according to another embodiment of the present disclosure.

Referring to FIG. 3, the cable-type secondary battery according to the present disclosure includes: a winding core 100 having guide portions 110 formed by intaglio or relief in a spiral shape on the surface thereof; a sheet-type first inner electrode 120 formed on the outside of the winding core surface between the guide portions by spiral winding; a sheet-type first separation layer 130 formed on the outside of the first inner electrode by spiral winding; a sheet-type second inner electrode 140 formed on the outside of the first separation layer by spiral winding; a second separation layer 150 formed on the outside of the second inner electrode by spiral winding; and an outer electrode 160 formed on the outside of the second separation layer by spiral winding; an aluminum pouch layer (not shown) formed on the outside of the outer electrode; and a polymer protective coating 170 formed on the outside of the aluminum pouch layer.

Figure 6:
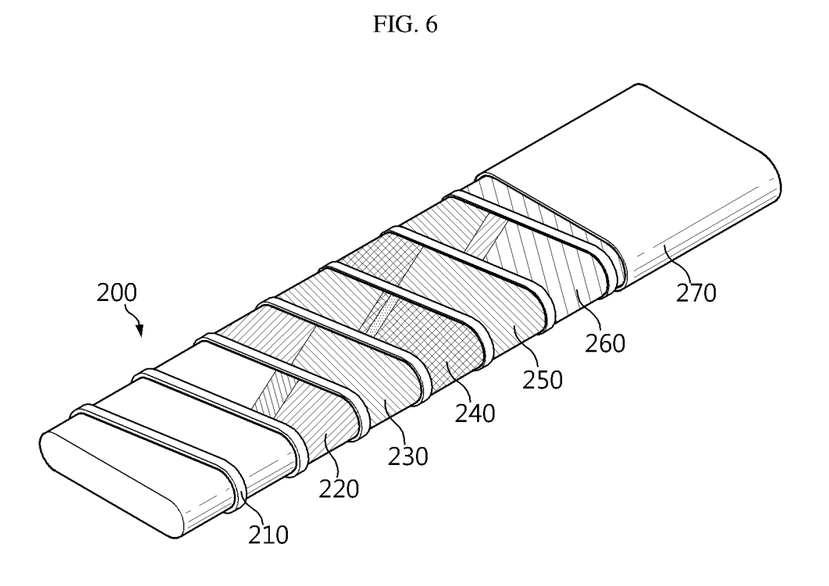
FIG. 6 shows the structure of the cable-type secondary battery according to an embodiment of the present disclosure.

Referring to FIG. 6, the cable-type secondary battery according to the present disclosure, wherein the section perpendicular to the longitudinal direction of the winding core is ellipsoidal, includes: a winding core 200 having guide portions 210 formed by intaglio or relief in a spiral shape on the surface thereof; a sheet-type first inner electrode 220 formed on the outside of the winding core surface between the guide portions by spiral winding; a sheet-type first separation layer 230 formed on the outside of the first inner electrode by spiral winding; a sheet-type second inner electrode 240 formed on the outside of the first separation layer by spiral winding; a second separation layer 250 formed on the outside of the second inner electrode by spiral winding; and an outer electrode 260 formed on the outside of the second separation layer by spiral winding; an aluminum pouch layer (not shown) formed on the outside of the outer electrode; and a polymer protective coating 270 formed on the outside of the aluminum pouch layer.

The pouch layer may be provided with a water barrier layer including a metal, such as aluminum, an insulating layer formed on one surface of the water barrier layer and including a polyester, such as PET, or polyamide, such as nylon, and a thermal adhesive layer formed on the other surface of the water barrier layer and including polypropylene, polycarbonate or polyethylene. In addition, the polymer protective coating may be a packaging formed by overmolding of a polymer material.

Hereinafter, the cable-type secondary battery according to an embodiment of the present disclosure and a method for manufacturing the same will be explained.

First, a winding core having guide portions formed by intaglio or relief in a spiral shape on the surface thereof is prepared. Then, a first inner current collector is formed on a polymer film and a first inner electrode active material layer is coated on the first inner current collector to form a first inner electrode. In addition, an outer current collector is formed on a polymer film and an outer electrode active material layer is coated on the outer current collector to form an outer electrode. Referring to a method for forming a first inner current collector and outer current collector on a polymer film, each of the materials for the current collectors may be formed through a known coating process (such as vapor deposition).

The second inner electrode active material layers are formed on both surfaces of the second inner current collector.

As a method for coating such an active material layer, a general coating process may be used. Particularly, an electroplating or anodic oxidation process may be used. However, it is preferred to form the active material layer through a coating process of electrode slurry containing an active material using a comma coater or slot die coater. In addition, in the case of electrode slurry containing an active material, a dip coating or extrusion coating process using an extruder may be used.

The first separator and the second separation layer are prepared by using a separator including a porous substrate.

Then, the first inner electrode, the first separation layer, the second inner electrode, the second separation layer and the outer electrode are wound successively on the outside of the winding core surface between the guide portions to provide an electrode assembly. After that, an aluminum pouch layer is formed to surround the exterior of the electrode assembly and a polymer protective coating is formed thereon.

The protective coating is an insulator formed on the outermost side to protect the electrodes against moisture in the air and external impact.

In the cable-type secondary battery according to an embodiment of the present disclosure, the winding core has a space therein and may have an opening through which electrolyte can come in/out between the inner part and the outer part. Herein, a polymer electrolyte may be formed in a wire-like shape by using an extruder to prepare a lithium ion supplying portion.

Otherwise, a non-aqueous electrolyte may be injected to the central portion of the winding core to form a lithium ion supplying core portion. In a variant, after preparing a battery assembly provided even with a protective coating, a non-aqueous electrolyte may be injected to the central portion of the inner electrode support of the battery, thereby forming a lithium ion supplying core portion. In another variant, a wire-type carrier made of sponge is prepared and a non-aqueous electrolyte is injected thereto to prepare a lithium ion supplying core portion.

In addition, according to an embodiment of the present disclosure, each of the sheet-type electrode and the separation layer may be formed successively between the second separation layer and the outer electrode in at least one layer, preferably 1-20 layers, through winding.

For example, in the case of a cable-type secondary battery including each of one additional sheet-type electrode and separation layer formed by winding, it includes: a winding core having guide portions formed by intaglio or relief in a spiral shape on the surface thereof; a sheet-type first inner electrode formed on the outside of the winding core surface between the guide portions by spiral winding; a sheet-type first separation layer formed on the outside of the first inner electrode by spiral winding; a sheet-type second inner electrode formed on the outside of the first separation layer by spiral winding; a second separation layer formed on the outside of the second inner electrode by spiral winding; a sheet-type third inner electrode formed on the outside of the second separation layer by spiral winding; a third separation layer formed on the outside of the third inner electrode by spiral winding; and an outer electrode formed on the outside of the second separation layer by spiral winding.

In addition, in the case of a cable-type secondary battery including two additional sheet-type electrodes and separation layers formed by winding, it includes: a winding core having guide portions formed by intaglio or relief in a spiral shape on the surface thereof; a sheet-type first inner electrode formed on the outside of the winding core surface between the guide portions by spiral winding; a sheet-type first separation layer formed on the outside of the first inner electrode by spiral winding; a sheet-type second inner electrode formed on the outside of the first separation layer by spiral winding; a second separation layer formed on the outside of the second inner electrode by spiral winding; a sheet-type third inner electrode formed on the outside of the second separation layer by spiral winding; a third separation layer formed on the outside of the third inner electrode by spiral winding; a sheet-type fourth inner electrode formed on the outside of the third separation layer by spiral winding; a sheet-type fourth separation layer formed on the outside of the fourth inner electrode by spiral winding; and an outer electrode formed on the outside of the fourth separation layer by spiral winding.

Another embodiment will be explained hereinafter.

The cable-type secondary battery according to an embodiment of the present disclosure includes: two or more winding cores having guide portions formed by intaglio or relief in a spiral shape on the surface thereof and aligned in parallel with each other; a sheet-type first inner electrode formed on the outside of the winding core surface between the guide portions of the two or more winding cores by spiral winding; a sheet-type first separation layer formed on the outside of the first inner electrode by spiral winding; two or more inner electrodes provided with a sheet-type second inner electrode formed on the outside of the first separation layer by spiral winding; a second separation layer surrounding the outside of the two or more inner electrodes and formed by spiral winding; and an outer electrode formed on the outside of the second separation layer by spiral winding.

In addition, the cable-type secondary battery according to another embodiment of the present disclosure includes: two or more winding cores having guide portions formed by intaglio or relief in a spiral shape on the surface thereof and aligned in parallel with each other; a lithium ion supplying core portion formed in each of the two or more winding cores; a sheet-type first inner electrode formed on the outside of the winding core surface between the guide portions of the two or more winding cores by spiral winding; a sheet-type first separation layer formed on the outside of the first inner electrode by spiral winding; two or more inner electrodes provided with a sheet-type second inner electrode surrounding the outside of the first separation layer and formed by spiral winding; a second separation layer formed on the outside of the two or more inner electrodes by spiral winding; and an outer electrode formed on the outside of the second separation layer by spiral winding.

Since the cable-type secondary battery is provided with an inner electrode having a plurality of electrodes, it is easy to adjust a balance between a cathode and an anode. In addition, since the cable-type secondary battery is provided with a plurality of electrodes, it is possible to prevent a short-circuit.

According to an embodiment of the present disclosure, even in the case of the cable-type secondary battery provided with two or more inner electrodes, each of the sheet-type electrode and separator may be formed between the second separation layer and the outer electrode in one or more layers, particularly 1-20 layers, through winding as described above.

What is claimed is:

1. A cable-type secondary battery, comprising:
a winding core having guide portions formed by intaglio or relief in a spiral shape on a surface thereof;
a sheet-shaped first inner electrode formed on the outside of the winding core surface between the guide portions by spiral winding;
a sheet-shaped first separation layer formed on the outside of the first inner electrode by spiral winding;
a sheet-shaped second inner electrode formed on the outside of the first separation layer by spiral winding;
a second separation layer formed on the outside of the second inner electrode by spiral winding; and
an outer electrode formed on the outside of the second separation layer by spiral winding.

2. The cable-type secondary battery according to claim 1, wherein the winding core is a wire-shaped, twisted wire-shaped, hollow, net-shaped, strip-shaped, or mesh-shaped winding core.

3. The cable-type secondary battery according to claim 1, wherein a section perpendicular to a longitudinal direction of the winding core has a circular, ellipsoidal, quadrangular or triangular shape.

4. The cable-type secondary battery according to claim 1, wherein the winding core comprises carbon nanotubes; stainless steel; aluminum; nickel; titanium; baked carbon; copper; stainless steel surface-treated with carbon, nickel, titanium or silver; aluminum-cadmium alloy; or a polymer.

5. The cable-type secondary battery according to claim 1, wherein the sheet-shaped first inner electrode, the first separation layer, the second inner electrode, the second separation layer and the outer electrode has a structure of a strip extended in one direction.

6. The cable-type secondary battery according to claim 1, wherein the first inner electrode and the outer electrode are cathodes and the second inner electrode is an anode, or the first inner electrode and the outer electrode are anodes and the second inner electrode is a cathode.

7. The cable-type secondary battery according to claim 1, wherein the first inner electrode comprises a first inner current collector and a first inner electrode active material layer formed on one surface of the first inner current collector,
the outer electrode comprises an outer current collector and an outer electrode active material layer formed on one surface of the outer current collector, and
the second inner electrode comprises a second inner current collector and second inner electrode active material layers formed on both surfaces of the second inner current collector.

8. The cable-type secondary battery according to claim 7, which further comprises a polymer film layer formed on at least one of another surface of the first inner current collector and another surface of the outer current collector.

9. The cable-type secondary battery according to claim 7, wherein at least one of the first inner current collector, the second current collector and the outer current collector is a film-shaped current collector or a mesh-shaped current collector.

* * * * *